(12) United States Patent
Ostling

(10) Patent No.: US 6,327,470 B1
(45) Date of Patent: Dec. 4, 2001

(54) HANDOVER BETWEEN FIXED AND MOBILE NETWORKS FOR DUAL MODE PHONES

(75) Inventor: Ralph Ostling, Richardson, TX (US)

(73) Assignee: Ericsson Inc., NC (US)

( * ) Notice: Subject to any disclaimer, the term of this patent is extended or adjusted under 35 U.S.C. 154(b) by 0 days.

(21) Appl. No.: 08/965,920

(22) Filed: Nov. 7, 1997

(51) Int. Cl.$^7$ ................................................ H04Q 7/20
(52) U.S. Cl. ................... 455/437; 455/436; 455/439; 455/426
(58) Field of Search ............................ 455/437, 436, 455/434, 439, 426, 552, 442, 417, 422, 432

(56) References Cited

U.S. PATENT DOCUMENTS

| | | | |
|---|---|---|---|
| 5,212,684 | * 5/1993 | MacNamee et al. | 370/283 |
| 5,367,558 | * 11/1994 | Gillig et al. | 455/426 |
| 5,406,615 | * 4/1995 | Miller, II et al. | 455/552 |
| 5,504,803 | * 4/1996 | Yamada et al. | 455/426 |
| 5,574,775 | * 11/1996 | Miller, II et al. | 455/444 |
| 5,594,781 | * 1/1997 | Kozdon et al. | 455/442 |
| 5,594,782 | * 1/1997 | Zicker et al. | 455/417 |
| 5,659,598 | * 8/1997 | Byrne et al. | 455/436 |
| 5,737,703 | * 4/1998 | Byrne | 455/442 |
| 5,873,033 | * 2/1999 | Hjern et al. | 455/417 |
| 5,887,259 | * 3/1999 | Zicker et al. | 455/434 |
| 5,913,166 | * 6/1999 | Buttita et al. | 455/436 |
| 5,995,828 | * 11/1999 | Nishida | 455/417 |
| 5,999,823 | * 2/1999 | Yoneyama et al. | 455/552 |

FOREIGN PATENT DOCUMENTS

| | | |
|---|---|---|
| 0 695 104 A2 | 1/1996 | (EP) . |
| 0 700 167 A1 | 3/1996 | (EP) . |

OTHER PUBLICATIONS

PCT International Search Report dated Apr. 12, 1999.

* cited by examiner

*Primary Examiner*—William G. Trost
*Assistant Examiner*—Joy K. Redmon

(57) ABSTRACT

A telecommunications system and method for performing a handover between the fixed (wireline) network and a mobile network during a call placed to or from a dual mode device, without any interruption in the voice or data connection. Therefore, for calls initiated in the fixed network, once the subscriber leaves the coverage area for the fixed mode of the dual mode device, the call continues as normal by transferring the call to the mobile network. Similarly, for calls initiated in the mobile network, once the subscriber moves back into the fixed mode coverage area, the call can be transferred to the fixed network in order to provide a lower rate to the subscriber, without any service interruption.

16 Claims, 4 Drawing Sheets

HANDOVER BETWEEN FIXED AND MOBILE NETWORKS FOR DUAL MODE PHONES

BACKGROUND OF THE PRESENT INVENTION

Field of the Invention

The present invention relates generally to telecommunications systems and methods for transferring a call between a mobile network and a fixed network, and specifically to performing a handover between the fixed network and a mobile network during a call placed to or from a dual mode phone, without any interruption in the voice or data connection.

BACKGROUND AND OBJECTS OF THE PRESENT INVENTION

Cellular telecommunications is one of the fastest growing and most demanding telecommunications applications ever. Today it represents a large and continuously increasing percentage of all new telephone subscriptions around the world.

Cellular networks have evolved into two different networks. The European cellular network primarily uses the Global System for Mobile Communication (GSM) digital mobile cellular radio system. In the United States, cellular networks have been, in the past, primarily analog, but many North American cellular networks have begun deploying Signaling System #7 (SS7) to support access of remote databases. SS7 relies on Common Channel Signaling, which uses a digital facility, but places the signaling information in a time slot or channel separate from the voice and data it is related to. This allows signaling information to be consolidated and sent through its own network apart from the voice network. European GSM cellular networks have always relied on SS7 for their signaling requirements. However, GSM is presently being used in North America, and may be the technology of choice for supporting the new Personal Communications System.

The GSM network is described herein below and is discussed in relation to FIG. 1 of the drawings. With reference now to FIG. 1 of the drawings, there is illustrated a GSM Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22. Mobile Station (MS) 20 is the physical equipment, e.g., a mobile phone or other portable device, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

SS7 protocols are used throughout the GSM cellular network to provide the signaling information required to establish circuit connections and disconnect circuit connections, as well as share database information from one entity to another. In addition, the signaling information used to connect calls within the Public Switched Telephone Network (PSTN) 29 (fixed or wireline network) is sent through the SS7 network. The MSC 14 connects to the SS7 network via a Signaling Transfer Point (STP) 28.

Dual mode phones, which are cordless phones connected to both the fixed network 29 and a mobile network 10, e.g., GSM, PCS, or an analog system, are currently being developed to enable a subscriber to have only one phone to handle both fixed and mobile calls. The subscriber pays for subscriptions to both the fixed network and to the mobile network, and has two separate phone numbers, one for each network. Advantageously, both phone numbers will correspond to one dual mode phone, which allows the subscriber to place and receive calls within the range of the fixed mode of the cordless dual mode phone using the fixed network 29, and to make and receive calls in any other location using the mobile network 10.

However, there is no existing method for transferring a call between the fixed network 29 and a mobile network 10 during a call. Typically, if a call is initiated in the fixed environment, and the subscriber leaves the fixed mode coverage area, e.g., the range of the cordless phone connected to the fixed network, the call will be lost. This requires the subscriber to re-dial the called party, using the mobile mode of the dual mode phone, in order to continue the conversation. Similarly, if a call is initiated in the mobile network, and the dual mode phone moves into the fixed mode coverage area for that phone, the call will not be transferred to the fixed network, which typically provides lower rates to subscribers than the mobile network.

It is therefore an object of the invention to perform a handover between the fixed network and a mobile network during a call without losing the speech connection, and without an interruption in service to the subscriber.

SUMMARY OF THE INVENTION

The present invention is directed to telecommunications systems and methods for performing a handover between the fixed network and a mobile network during a call placed to or from a dual mode device, without any interruption in the voice or data connection. Therefore, for calls initiated in the fixed network, once the subscriber leaves the coverage area for the fixed mode of the dual mode device, the call continues as normal by transferring the call to the mobile network. Similarly, for calls initiated in the mobile network, once the subscriber moves back into the fixed mode coverage area, the call can be transferred to the fixed network in order to provide a lower rate to the subscriber, without any service interruption.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
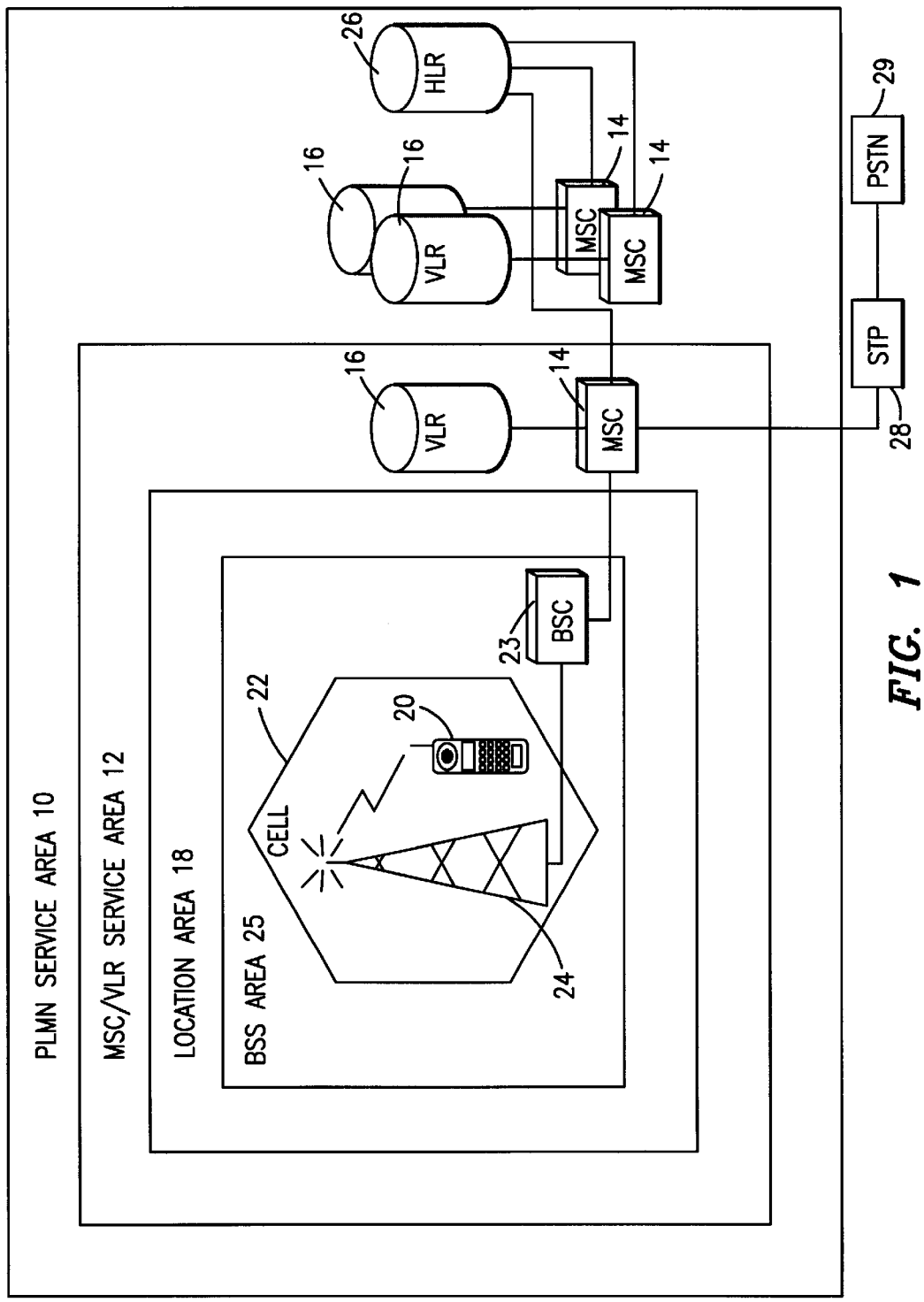
FIG. 1 is a block diagram of a conventional terrestrially-based wireless GSM telecommunications system.
Figure 2:
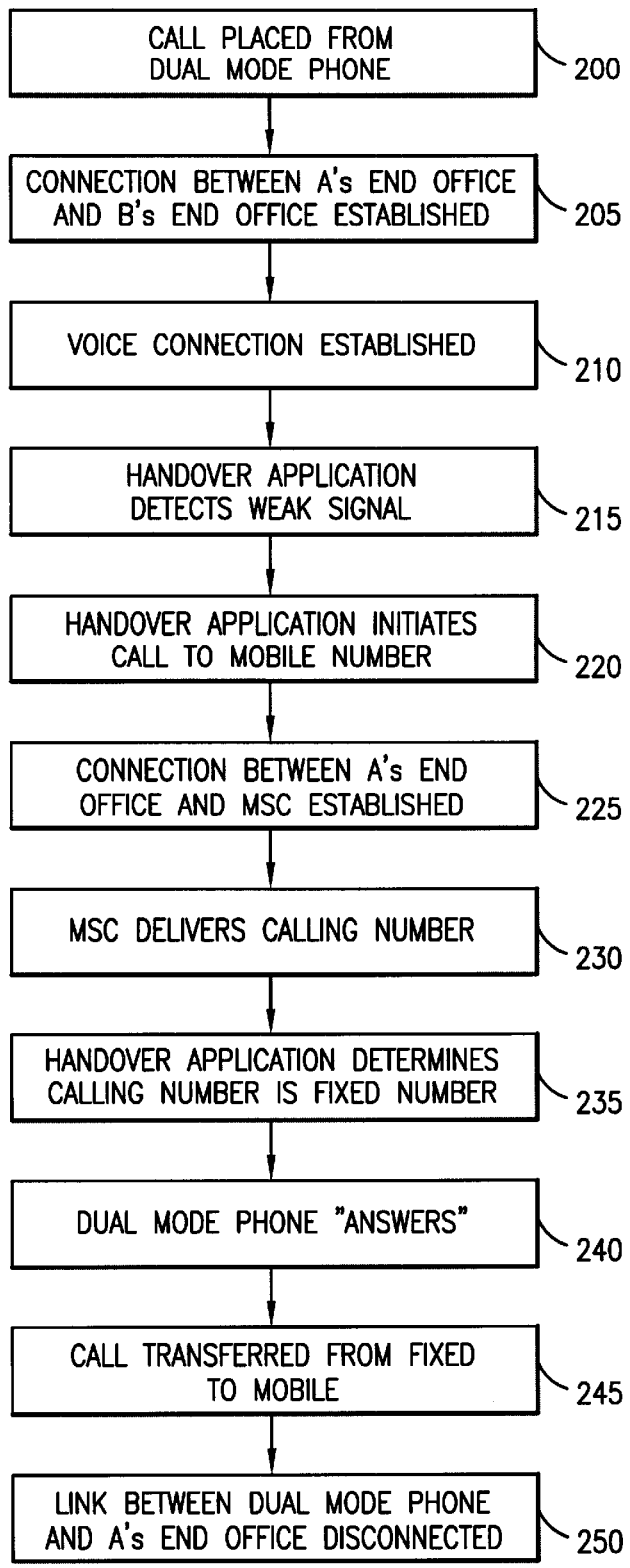
FIG. 2 depicts steps in a sample embodiment of the dual mode phone handover process of the present invention.
Figure 3:
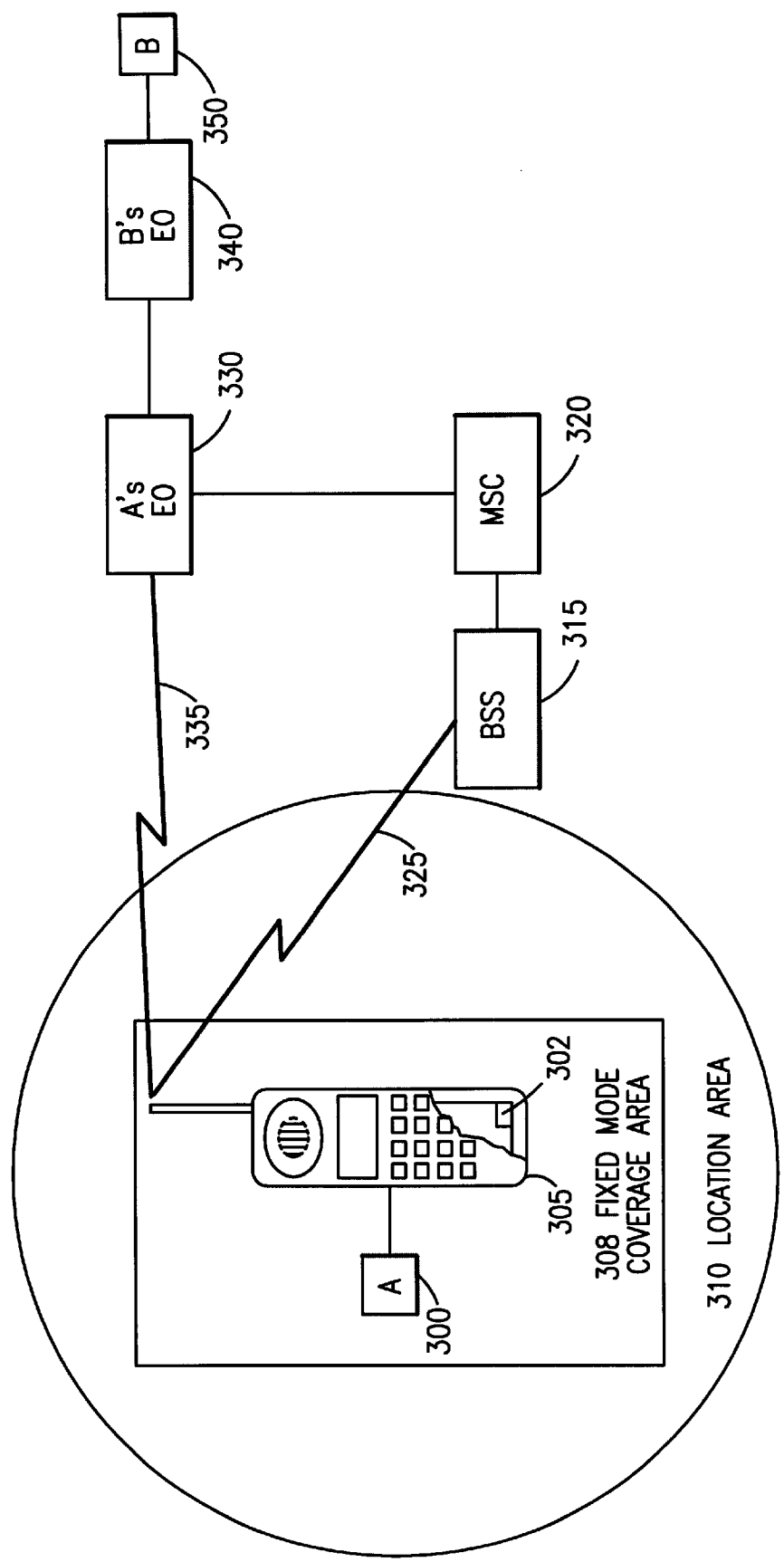
FIG. 3 is a block diagram showing the interconnection of the various nodes during a dual mode phone handover between the fixed network and a mobile network.

Dual mode phones have two subscriptions associated with them, one in a mobile network and one in the fixed (local) network. As shown in FIG. 2, which will be discussed in connection with FIG. 3, once a call is placed to or from a dual mode phone subscriber 300 (hereinafter referred to as Subscriber A) within the fixed network (step 200), a call connection between Subscriber A's end office 330 and the calling/called party's (hereinafter referred to as Subscriber B) end office 340 is initiated (step 205). Thereafter, a voice connection between Subscriber A 300 and Subscriber B 350 is established (step 210).

Once Subscriber A 300 begins to leave the coverage area for the fixed mode 308 of the dual mode phone 305, a Handover Application 302 within the dual mode phone 305 detects that the signal strength is weakening (step 215), and initiates a new call to the mobile number associated with the dual mode phone 305 (step 220). The fixed mode coverage area 308 for the dual mode phone 305 varies depending on the phone used, but typically only encompasses a very limited area, e.g., less than a quarter of a mile. However, for some phones, the fixed mode coverage area 308 consists of several small isolated areas, such as within several different office buildings, each in a separate location.

The handover process begins by the Handover Application 302 sending the digits associated with Subscriber A's 300 mobile number to Subscriber A's end office 330 (step 220). Subscriber A's end office 330 then sends a signaling message to the Mobile Services Center (MSC) 320 serving the Location Area (LA) 310 that Subscriber A 300 is in to establish a call connection between Subscriber A's end office 330 and the MSC 320 (step 225). Thereafter, the MSC 320 delivers the calling number (fixed number) in, for example, a SETUP message, to Subscriber A's dual mode phone 305 (step 230) via a Base Station System (BSS) 315 to be received by the Handover Application 302 within the dual mode phone 305. The Handover Application 302 then determines that the calling number is the fixed number associated with the dual mode phone (step 235), and instructs the dual mode phone 305 to "answer" the call (step 240). A call transfer from the fixed mode of the dual mode phone 305 to the mobile mode of the dual mode phone 305 (step 245) is then initiated by the Handover Application 302.

After the mobile connection is established (step 245), the Handover Application 302 within the dual mode phone 305 disconnects the link 335 between the dual mode phone 305 and Subscriber A's end office 330 (step 250). Thus, the call is now routed through Subscriber A's end office 330 to be handled by the MSC 320. Advantageously, this handover process does not produce any interruption in the call, and allows the call to continue even though Subscriber A 300 has crossed the perimeter of the fixed mode coverage area 308 and left the fixed mode coverage area 308. The fixed mode coverage area 308 is typically substantially within the location area 310 covered by the MSC 320. However, it should be noted that the fixed mode coverage area 308 could lie along an edge covered by two separate MSC's 320.

This process resembles a three-way call, in which two of the parties involved are associated with the dual mode phone 305. As such, when the Handover Application 302 within the dual mode phone 305 connects Subscriber A's end office 330 and the MSC 320, the handling of the call is similar to a three-way call, in which all of the parties are connected simultaneously. Thereafter, the process resembles a call transfer process, in which calls to or from the fixed network 330 are routed through the fixed network 330 to the mobile network 320. The tear-down of the link between Subscriber A's end office 330 and the dual mode phone 305 then follows a typical tear-down of a three-way call, in which the links between each of the parties are disconnected separately. In this case, only the link 355 between the dual mode phone 305 and Subscriber A's end office 330 is severed. Thereafter, the remaining links between Subscriber A 300 and Subscriber B 350 can be disconnected by normal call termination.

In alternative embodiments of the present invention, since the billing rate is normally higher in mobile networks than in fixed networks, prior to transferring the call from the fixed network to the mobile network, the subscriber can be notified, e.g., with a tone or series of tones on the dual mode phone 305, indicating to the subscriber that a handover to the mobile network is about to take place. Therefore, the subscriber can have the option of returning to the fixed mode coverage area 308 of the dual mode phone 305, continuing the call using the mobile network, or disconnecting the call. If the subscriber chooses to return to the fixed mode coverage area 308, another tone or series of tones can be provided to the subscriber to notify the subscriber that the dual mode phone 305 has re-entered the fixed mode coverage area 308.

Figure 4:
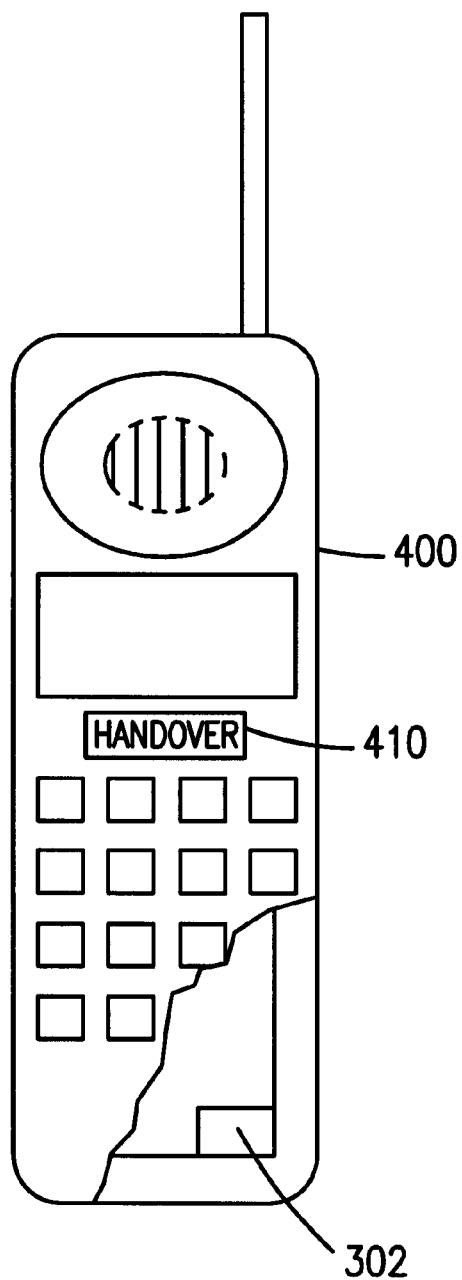
FIG. 4 illustrates the implementation of one aspect of the handover process of the present invention within the dual mode phone itself.

In another alternative embodiment, as shown in FIG. 4, the dual mode phone 400 can have a "handover" button 410, which the subscriber presses to manually initiate the handover. In this embodiment, the dual mode phone 400 can send a signal strength warning tone to the subscriber, indicating that the subscriber is leaving the fixed mode coverage area 308, which would allow the subscriber to either press the "handover" button 410 and initiate the call transfer, return to the fixed mode coverage area 308, or disconnect the call before the subscriber leaves the fixed mode coverage area 308.

It should be noted that the aforedescribed handover process also applies when a call is initiated in the mobile network, and the subscriber moves into the fixed mode coverage area 308. In this situation, a mobile network to fixed network handover can be initiated by the Handover Application 302 within the dual mode phone 305. This is accomplished by the Handover Application 302 first recognizing that the fixed mode coverage area 308 has been entered, e.g., by comparing the location update information received by the Base Station System 315 with stored fixed mode location information, and then sending the dialed digits associated with the fixed number to the MSC 320 via the BSS 315. The process can then continue as stated hereinbefore, with the end result being that the call is transferred to the fixed network and the mobile link 325 between the dual mode phone 305 and the MSC 320 is disconnected.

As will be recognized by those skilled in the art, the innovative concepts described in the present application can be modified and varied over a wide range of applications. Accordingly, the scope of patented subject matter should not be limited to any of the specific exemplary teachings discussed.

For example, it should be noted that the handover process disclosed herein is applicable to all mobile networks, including, but not limited to, AMPS, and D-AMPS, and is not limited to GSM or PCS networks.

It should also be noted that this application can be applied to other dual mode devices, e.g., laptop computers, which are connected to both the fixed network and the mobile network, and should not be limited to dual mode phones.

What is claimed is:

1. A telecommunications system for performing a handover between a fixed network and a mobile network during a call on a given one of a plurality of dual mode devices, said telecommunications system comprising:

a handover application located within said given dual mode device, said handover application initiating, in response to detecting said given dual mode device leaving a fixed mode coverage area associated with said fixed network, a call request to a mobile subscription number associated with said given dual mode device in said mobile network, said call request including a fixed subscription number associated with said given dual mode device in said fixed network, said handover application subsequently recognizing said fixed subscription number within an incoming call to said dual mode device from said mobile network and instructing said dual mode device to answer said incoming call to establish a connection with the mobile network, said handover application further disconnecting an established link between said given dual mode device and said fixed network after establishment of the connection with the mobile network;

an end office within said fixed network for establishing a connection with said mobile network and forwarding said call request to said mobile network in response to receiving said call request from said handover application; and a mobile services center within said mobile network for forwarding said call request to said mobile subscription number associated with said dual mode device in response to said end office establishing a connection therewith.

2. The telecommunications system of claim 1, wherein said handover application detects when said given dual mode device leaves said fixed mode coverage area by monitoring when the signal strength of said given dual mode device within said fixed mode coverage area weakens.

3. The telecommunications system of claim 1, wherein said fixed subscription number is sent to said given dual mode device in a SETUP message.

4. The telecommunications system of claim 1, wherein said given dual mode device contains a handover button, said handover button being used to activate said handover application.

5. The telecommunications system of claim 1, wherein said given dual mode device conveys, during said call, at least one tone to a subscriber associated with said given dual mode device when the location of said given dual mode device changes with respect to said fixed mode coverage area.

6. The telecommunications system of claim 1, further comprising a base station system attached to said mobile services center and being in wireless communication with said given dual mode device.

7. A method for performing a handover within a telecommunications system between a fixed network and a mobile network during a call on a given one of a plurality of dual mode devices, said method comprising the steps of:

determining, by a handover application located within said given dual mode device, during said call, when said given dual mode device leaves a fixed mode coverage area associated with said fixed network;

transmitting a call request to a mobile subscription number associated with said given dual mode device in said mobile network by means of an end office within said fixed network, said call request including a fixed subscription number;

forwarding said call request from said end office to a mobile services center within said mobile network;

forwarding, by said mobile services center, said call request including said fixed subscription number associated with said dual mode device in said fixed network;

recognizing, by said handover application, said fixed subscription number;

establishing a call connection to said mobile services center; and disconnecting a call link between said given dual mode device and said end office.

8. The method of claim 7, wherein said step of determining when said given dual mode device leaves said fixed mode coverage area is performed by said handover application monitoring when the signal strength of said given dual mode device within said fixed mode coverage area weakens.

9. The method of claim 7, wherein said given dual mode device contains a handover button, said handover button being used to begin said step of transmitting said call request.

10. The method of claim 7, wherein said given dual mode device conveys, during said call, at least one tone to a subscriber associated with said given dual mode device when the location of said given dual mode device changes with respect to said fixed mode coverage area.

11. The method of claim 7, wherein said telecommunications system further includes a base station system attached to said mobile services center and being in wireless communication with said given dual mode device.

12. The method of claim 7, wherein said step of forwarding by said mobile services center is performed by sending said fixed subscription number to said handover application within said given dual mode device in a SETUP message.

13. A telecommunications system for performing a handover between a fixed network and a mobile network during a call on a given one of a plurality of dual mode devices, said telecommunications system comprising:

a handover application located within said given dual mode device, said handover application initiating, in response to detecting said given dual mode device entering a fixed mode coverage area associated with said fixed network, a call request to a fixed subscription number associated with said given dual mode device in said fixed network, said call request including a mobile subscription number associated with said given dual mode device in said mobile network, said handover application subsequently recognizing said mobile subscription number within an incoming call to said dual mode device from said fixed network and instructing said dual mode device to answer said incoming call to establish a connection with the fixed network, said handover application further disconnecting said establish link between said given dual mode device and said mobile network after establishment of the connection with the fixed network;

a mobile services center within said mobile network for establishing a connection with said fixed network and forwarding said call request to said fixed network in response to receiving said call request from said handover application; and an end office within said fixed network for forwarding said call request to said fixed subscription number associated with said dual mode device in response to said mobile services center establishing connection therewith.

14. A method for performing a handover within a telecommunications system between a fixed network and a mobile network during a call on a given one of a plurality of dual mode devices, said method comprising the steps of:

determining, by a handover application located within said given dual mode device, during said call, when said given dual mode device enters a fixed mode coverage area associated with said fixed network;

transmitting a call request to a fixed subscription number associated with said given dual mode device in said fixed network by means of a mobile services center within said mobile network, the call request including a mobile subscription number;

forwarding said call request from said mobile services center to an end office within said fixed network;

forwarding, by said end office, said call request including said mobile subscription number associated with said dual mode device in said mobile network;

recognizing, by said handover application, said mobile subscription number;

establishing a call connection to said end office; and disconnecting a call link between said given dual mode device and said mobile services center.

15. The telecommunications system of claim 13, wherein said handover application determines when said given dual mode device enters said fixed mode coverage area by comparing first location information sent from said mobile services center with second location information associated with said fixed mode coverage area stored within said given dual mode device.

16. The method of claim 14, wherein said step of determining when said given dual mode device enters said fixed mode coverage area is performed by said handover application comparing first location information transmitted by said mobile services center to said given dual mode device with second location information associated with said fixed mode coverage area stored within said dual mode device.

* * * * *